(12) United States Patent
Nguyen et al.

(10) Patent No.: US 6,729,404 B2
(45) Date of Patent: *May 4, 2004

(54) METHODS AND COMPOSITIONS FOR CONSOLIDATING PROPPANT IN SUBTERRANEAN FRACTURES

(75) Inventors: Philip D. Nguyen, Duncan, OK (US); Jimmie D. Weaver, Duncan, OK (US); Michael A. McCabe, Duncan, OK (US); Johnny A. Barton, Marlow, OK (US); O. Marlene Isenberg, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/183,200

(22) Filed: Jun. 26, 2002

(65) Prior Publication Data

US 2003/0131999 A1 Jul. 17, 2003

Related U.S. Application Data

(63) Continuation-in-part of application No. 10/041,142, filed on Jan. 8, 2002, now Pat. No. 6,668,926.

(51) Int. Cl.$^7$ ............................................. E21B 43/02
(52) U.S. Cl. ................................. 166/280.2; 166/281
(58) Field of Search ................................. 166/280, 281, 166/295, 308, 280.1, 280.2

(56) References Cited

U.S. PATENT DOCUMENTS

| | | | |
|---|---|---|---|
| 4,042,032 A | 8/1977 | Anderson et al. | 166/276 |
| 4,070,865 A | 1/1978 | McLaughlin | 61/36 C |
| 4,074,760 A | 2/1978 | Copeland et al. | 166/276 |
| 4,336,842 A | 6/1982 | Graham et al. | 166/276 |
| 4,829,100 A | 5/1989 | Murphey et al. | 523/131 |
| 5,128,390 A | 7/1992 | Murphey et al. | 523/130 |
| 5,381,864 A | 1/1995 | Nguyen et al. | 166/280 |
| 5,393,810 A | 2/1995 | Harris et al. | 524/56 |
| 5,529,123 A | 6/1996 | Carpenter et al. | 166/293 |
| 5,609,207 A | 3/1997 | Dewprashad et al. | 166/276 |
| 5,839,510 A | 11/1998 | Weaver et al. | 166/276 |
| 5,921,317 A | 7/1999 | Dewprashad et al. | 166/208 |
| 5,924,488 A | 7/1999 | Nguyen et al. | 166/280 |
| 5,960,880 A | 10/1999 | Nguyen et al. | 166/280 |
| 6,003,600 A | 12/1999 | Nguyen et al. | 166/281 |
| 6,016,870 A | 1/2000 | Dewprashad et al. | 166/295 |
| 6,311,773 B1 | 11/2001 | Todd et al. | 166/280 |

OTHER PUBLICATIONS

S. W. Almond et al., "Factors Affecting Proppant Flowback With Resin Coated Proppants," SPE 30096 (1995 European Formation Damage Conference, May 15–16, 1995).

*Primary Examiner*—William Neuder
(74) *Attorney, Agent, or Firm*—Robert A. Kent; C. Clark Dougherty, Jr.

(57) ABSTRACT

Improved methods of coating dry proppant particles with a hardenable resin composition, suspending the coated proppant particles in a fracturing fluid and consolidating the proppant particles after being placed in fractures into high strength permeable masses are provided. As the fractures are formed, a liquid hardenable resin component is mixed with a liquid hardening agent component to form a hardenable resin composition. The hardenable resin composition is coated onto dry proppant particles conveyed from a source thereof to form resin composition coated proppant particles, and the resin composition coated proppant particles are suspended in the fracturing fluid.

84 Claims, No Drawings

METHODS AND COMPOSITIONS FOR CONSOLIDATING PROPPANT IN SUBTERRANEAN FRACTURES

CROSS-REFERENCES TO RELATED APPLICATIONS

This Application Is A Continuation-In-Part of U.S. application Ser. No. 10/041,142 filed on Jan. 8, 2002 now U.S. Pat. No. 6,668,926.

BACKGROUND OF THE INVENTION

1. Field of the Invention

The present invention relates to improved methods and compositions for consolidating proppant in subterranean fractures formed by a gelled liquid fracturing fluid.

2. Description of the Prior Art

Hydrocarbon producing wells are often stimulated by hydraulic fracturing treatments. In hydraulic fracturing treatments, a viscous fracturing fluid which also functions as a carrier fluid is pumped into a producing zone to be fractured at a rate and pressure such that one or more fractures are formed in the zone. Particulate solids, e.g., graded sand, for propping the fractures, commonly referred to in the art as "proppant" are suspended in a portion of the fracturing fluid so that the particulate solids are deposited in the fractures when the fracturing fluid is broken. That is, a breaker is included in the fracturing fluid whereby the fracturing fluid reverts to a thin fluid which is returned to the surface. The proppant deposited in the fractures functions to prevent the fractures from closing so that conductive channels are formed through which produced hydrocarbons can readily flow.

In order to prevent the subsequent flow-back of proppant as well as loose or incompetent sand in the fractured zone with fluids produced therefrom, a portion of the proppant introduced into the fractures has heretofore been coated with a hardenable resin composition which is caused to harden and consolidate the proppant particles in the zone. Typically, the hardenable resin composition coated proppant is deposited in the fractures after a large quantity of uncoated proppant has been deposited therein. That is, the last portion of the proppant deposited in each fracture, referred to in the art as the "tail-end" portion, is coated with the hardenable resin composition. When the viscous fracturing fluid which is the carrier fluid for the proppant is broken and reverts to a thin fluid as described above, the hardenable resin coated proppant is deposited in the fractures and the fractures close on the proppant. The partially closed fractures apply pressure on the hardenable resin coated proppant particles whereby the particles are forced into contact with each other while the resin composition hardens. It has heretofore been thought that the hardening of the resin composition under pressure brings about the consolidation of the resin coated proppant particles into a hard permeable pack having sufficient compressive and tensile strength to prevent unconsolidated proppant and formation sand from flowing out of the fractures with produced fluids. However, it has been found that as the fracturing fluid containing proppant without a hardenable resin composition coating thereon is carried into the fractures by the fracturing fluid, some of the proppant is continuously deposited in the bottom of the fractures adjacent to the well bore. This unconsolidated accumulation of non-resin coated proppant remains in the fractures adjacent to the well bore and when the hardenable resin coated proppant enters the fractures at the end of the proppant deposit, it does not displace the uncoated proppant at the bottom of the fractures. Instead, the hardenable resin coated proppant flows over the uncoated proppant. This results in unconsolidated proppant at the bottom of the fractures adjacent to the well bore. During the subsequent production of formation fluids through the propped fractures, the unconsolidated proppant at the bottom of the fractures flows back with the formation fluids. The flowback of the proppant with the formation fluids is very detrimental in that it erodes metal goods, plugs piping and vessels and causes damage to valves, instruments and other production equipment.

Another problem encountered in the use of prior hardenable resin compositions for coating proppant particles is that the hardenable resin composition components, i.e., the liquid hardenable resin component and the liquid hardening agent component, have heretofore had very short shelf lives. That is, the shelf lives of the hardenable resin composition components have heretofore been as short as about four days or less. In addition, the hardenable resin composition components have heretofore had very low flash points, i.e., flash points of about 60° F. or below making them very dangerous to use.

Thus, there are needs for improved methods of consolidating proppant particles in subterranean fractures whereby all of the proppant particles are consolidated into high strength permeable packs in the fractures which do not permit the flow-back of proppant, formation sand and the like. Further, there are needs for improved hardenable resin compositions and/or the components thereof that have long shelf lives and high flash points, i.e., flash points above 125° F.

SUMMARY OF THE INVENTION

The present invention provides improved methods of coating dry proppant particles with a resin composition and suspending the coated proppant particles in a fracturing fluid as well as improved hardenable resin compositions and components thereof which meet the needs described above and overcome the deficiencies of the prior art. The resin compositions of this invention harden and consolidate resin coated proppant particles into high strength permeable packs in fractures formed in subterranean zones which do not allow proppant flow-back. The methods are basically comprised of the following steps. A liquid hardenable resin component is provided comprised of a hardenable resin and optionally, a solvent for the resin. A liquid hardening agent component is provided comprised of a hardening agent, a silane coupling agent, a hydrolyzable ester for breaking gelled fracturing fluid films on the proppant particles, a surfactant for facilitating the coating of the resin on the proppant particles and for causing the hardenable resin to flow to the contact points between adjacent resin coated proppant particles, a liquid carrier fluid and optionally, a viscosifying agent for viscosifying the carrier fluid and dispersing the hardening agent when the hardening agent is a particulate solid. In addition, a source of dry proppant particles and a gelled liquid fracturing fluid are provided. The gelled liquid fracturing fluid is pumped into a subterranean zone to form one or more fractures therein and to place the hardenable resin composition coated proppant particles in the fractures. As the fractures are formed by the fracturing fluid, the liquid hardenable resin component is mixed with the liquid hardening agent component to form a liquid hardenable resin composition. The liquid hardenable resin composition is continuously coated on dry proppant particles conveyed from the source of the dry proppant particles. The resulting hardenable resin composition coated proppant particles are continuously mixed with the fracturing fluid whereby the hardenable resin composition coated proppant particles are suspended in the fracturing fluid and are deposited in the one or more fractures formed wherein they are caused to harden and consolidate into a high strength permeable pack which prevents proppant flow-back. When the hardenable resin composition coated proppant particles have been placed in the one or more fractures, the pumping of the fracturing fluid, the mixing of the liquid hardenable resin component with the liquid hardening agent component, the coating of the dry proppant particles with the hardenable resin composition and the mixing with and suspending of the resin composition coated proppant particles with the fracturing fluid are terminated. The hardenable resin composition on the coated proppant particles is allowed to harden and to consolidate the proppant into one or more high strength permeable packs which prevent proppant flow-back.

Another improved method of the present invention for coating dry proppant particles with a resin composition and suspending the coated proppant particles in a fracturing fluid, the resin composition hardening and consolidating the resin coated proppant particles into a high strength permeable mass which prevents proppant flow-back after being placed in one or more fractures formed in a subterranean zone is comprised of the following steps. A liquid hardenable resin component as described above and a liquid hardening agent component as described above are provided along with a source of dry proppant particles and a gelled liquid fracturing fluid. The gelled liquid fracturing fluid is pumped into the subterranean zone to form one or more fractures therein and to place the hardenable resin composition coated proppant particles in the fractures. The liquid hardenable resin component is mixed with the liquid hardening agent component to form a hardenable resin composition. The volume ratio of the liquid hardening agent component to the liquid hardenable resin component is varied from an initial volume ratio to a lower volume ratio and then back to the initial volume ratio in order to consolidate all of the proppant particles in the fractures while conserving the amount of the liquid hardening agent component used. The hardenable resin composition is continuously coated onto dry proppant particles conveyed from the source thereof to form hardenable resin composition coated proppant particles. The hardenable resin composition coated proppant particles are continuously mixed with the fracturing fluid so that the hardenable resin composition coated proppant particles are suspended in the fracturing fluid and are deposited in the fractures. Thereafter, the pumping of the fracturing fluid into the subterranean zone, the mixing of the liquid hardenable resin component with the liquid hardening agent component, the coating of the hardenable resin composition onto the dry proppant particles to form hardenable resin composition coated proppant particles and the mixing with and suspending of the resin composition coated proppant particles in the fracturing fluid are terminated. The hardenable resin composition on the coated proppant particles is allowed to harden and to consolidate the proppant into one or more high strength permeable packs which prevent proppant flow-back.

Yet another improved method of the present invention for coating dry proppant particles with a resin composition and suspending the coated proppant particles in a fracturing fluid, the resin composition hardening and consolidating the resin coated proppant particles into a high strength permeable mass which prevents proppant flow-back after being placed in one or more fractures formed in a subterranean zone by way of a perforated interval or intervals in a well bore penetrating the subterranean zone is comprised of the following steps. A liquid hardenable resin component as described above and a liquid hardening agent component as described above are provided along with a source of dry proppant particles and a gelled liquid fracturing fluid. The gelled liquid fracturing fluid is pumped into the subterranean zone to form one or more fractures therein and to place proppant particles in the fractures. The liquid hardenable resin component is mixed with the liquid hardening agent component to form a hardenable resin composition. The hardenable resin composition is intermittently coated onto dry proppant particles continuously conveyed from the source thereof to form hardenable resin composition coated proppant particles and uncoated proppant particles. The hardenable resin composition coated proppant particles and uncoated proppant particles are continuously mixed with the fracturing fluid so that the hardenable resin composition coated proppant particles and the uncoated proppant particles are suspended in the fracturing fluid and are deposited in the fractures. Thereafter, the pumping of the fracturing fluid into the subterranean zone, the mixing of the liquid hardenable resin component with the liquid hardening agent component, the intermittent coating of the hardenable resin composition onto the dry proppant particles to form hardenable resin composition coated proppant particles and uncoated proppant particles and the mixing with and suspending of the resin composition coated proppant particles in the fracturing fluid are terminated. The hardenable resin composition on the coated proppant particles is allowed to harden and to consolidate the proppant into one or more high strength permeable packs which prevent proppant flow-back.

The liquid hardenable resin compositions for coating proppant particles of this invention are comprised of a hardenable resin, a hardening agent for causing the hardenable resin to harden, a silane coupling agent, a hydrolyzable ester for breaking gelled fracturing fluid films on the proppant particles, a surfactant for facilitating the coating of the resin on the proppant particles and for causing the hardenable resin to flow to the contact points between adjacent resin coated proppant particles and a liquid carrier fluid having a flash point above about 125° F.

The objects, features and advantages of the present invention will be readily apparent to those skilled in the art upon a reading of the description of preferred embodiments which follows.

DESCRIPTION OF PREFERRED EMBODIMENTS

As mentioned above, the prior art methods of consolidating proppant in subterranean fractures have generally included the placement of a large quantity of uncoated proppant in the fractures followed by a tail-end portion of proppant coated with a hardenable resin composition. When the viscous fracturing fluid which is the carrier for the proppant is broken and reverts to a thin fluid, the proppant is deposited in the fractures. The tail-end portion of the proppant which is coated with a hardenable resin composition is consolidated into a hard permeable mass by the resin composition, but the uncoated proppant previously deposited in the bottom of the fractures as the large quantity of uncoated proppant was transported into the fractures is not consolidated. As a result, when the well is placed on production, flow-back of the uncoated proppant takes place.

Another problem which is encountered in consolidating the proppant to prevent flow-back involves the strength of the consolidated resin coated proppant packs in the fractures. Heretofore, it has been a common practice to utilize proppant that is precoated with a resin composition and stored. When the precoated proppant is required for use at a job site, it is transported to the job site. While such precoated resin coated proppant is consolidated after being placed by a hardening agent, the resulting consolidated proppant pack often does not have enough strength to prevent deterioration and proppant flow-back.

In accordance with the methods of the present invention, all or part of the proppant transported into the fractures is coated with a resin composition (preferably on-the-fly) and is suspended in the fracturing fluid as the fracturing fluid is pumped into the well bore and into the fractures. As a result, the resin coating on the proppant is fresh and when it hardens and consolidates the proppant, high strength permeable proppant packs are formed in the fractures which prevent proppant flow-back. In addition, the hardenable resin composition components of this invention have long shelf lives, e.g., four months and longer. The components, i.e., the liquid hardenable resin component and the liquid hardening agent component are stored separately until they are mixed in a weight ratio of 1.5 parts liquid hardenable resin component to 1 part liquid hardening agent component just prior to being coated onto proppant. The mixing of the components can be by batch mixing or the two components can be metered through a static mixer to obtain a homogeneous mixture before being coated on dry proppant particles while the proppant particles are conveyed in a sand screw. The amount of mixed liquid hardenable resin composition coated on the proppant ranges from about 0.1% to about 5% by weight of the proppant with about 3% being preferred.

As will be described further hereinbelow, in order to conserve the amount of hardening agent utilized for curing the hardenable resin which has been deposited on all of the proppant in the fractures, the volume ratio of liquid hardening agent component to liquid hardenable resin component utilized in accordance with this invention can be varied. In a preferred technique, the volume ratio of the liquid hardening agent component to the liquid hardenable resin component is varied from an initial volume ratio at the beginning of the proppant suspended in the fracturing fluid to a lower volume ratio as the middle portion of the proppant is suspended in the fracturing fluid and then back to the initial volume ratio at the end portion of the proppant suspended in the fracturing fluid. This technique results in consolidated proppant packs in the fractures which have high strength at the forward ends of the packs, less strength at the middle portions of the packs and high strength at the end portions of the packs. The middle portions of the packs tend to be placed deeply in the fractures far away from the well bore. Since all of the proppant is consolidated, there is no unconsolidated proppant remaining in the bottoms of the fractures and as a result proppant flow-back does not occur.

When it is desirable or necessary to conserve a major portion of the hardenable resin composition, the hardenable resin composition can be applied to an initial portion of the proppant particles deposited in one or more fractures, not applied or intermittently applied to the middle portion of the proppant particles deposited in the fractures and applied to the last portion of the proppant particles deposited in the fractures.

In accordance with one improved method of this invention, dry proppant particles are coated with the hardenable resin composition, preferably on-the-fly, the coated proppant particles are suspended in the fracturing fluid, preferably on-the-fly, and the resulting hardenable resin composition coated proppant particles are placed in one or more fractures formed in a subterranean zone. The method is basically comprised of the following steps. A liquid hardenable resin component is provided comprised of a hardenable resin and optionally, a solvent for the resin having a high flash point. When used, the solvent is added to the resin to reduce its viscosity for ease of handling, mixing and transferring. However, as will be understood by those skilled in the art, the solvent can be omitted and the liquid hardenable resin can be heated to reduce its viscosity. A liquid hardening agent component is provided comprised of a hardening agent, a silane coupling agent, a hydrolyzable ester for breaking gelled fracturing fluid films on the proppant particles, a surfactant for facilitating the coating of the resin on the proppant particles and for causing the hardenable resin to flow to the contact points between adjacent resin coated proppant particles, a liquid carrier fluid having a high flash point and optionally, a viscosifying agent for viscosifying the carrier fluid and dispersing the hardening agent when the hardening agent is a particulate solid. When the hardening agent is a particulate solid, it can be added separately to the resin composition and the viscosifying agent can be omitted. Also, when a liquid hardening agent is used, the viscosifying agent can be omitted. In addition to the liquid hardenable resin component and the liquid hardening agent component, dry proppant particles and a gelled liquid fracturing fluid are provided. The gelled liquid fracturing fluid is pumped into a subterranean zone to form one or more fractures therein and to place the resin composition coated proppant particles in the fractures. As the fractures are formed by the fracturing fluid, the liquid hardenable resin component is mixed with the liquid hardening agent component, preferably on-the-fly, to form the hardenable resin composition. The hardenable resin composition is continuously coated on the dry proppant particles which are conveyed from the source thereof, preferably on-the-fly, to form hardenable resin composition coated proppant particles. The hardenable resin composition coated proppant particles are continuously mixed with the fracturing fluid, preferably on-the-fly, whereby the hardenable resin composition coated proppant particles are suspended therein. Thereafter, the hardenable resin composition coated proppant particles are carried into the fractures whereupon the pumping of the fracturing fluid and other related steps are terminated. As is well understood by those skilled in the art, the gelled liquid fracturing fluid can include a breaker which causes it to revert to a thin fluid so that the resin composition coated proppant particles are deposited in the fractures and the fracturing fluid is returned to the surface.

The term "on-the-fly" is used herein to mean that a flowing stream is continuously introduced into another flowing stream so that the streams are combined and mixed while continuing to flow as a single stream. While the mixing of the liquid hardenable resin component with the liquid hardening agent component to form the hardenable resin composition, the coating of the dry proppant particles with the hardenable resin composition and the mixing of the hardenable resin coated proppant particles with the fracturing fluid are all preferably accomplished on-the-fly, as is well understood by those skilled in the art such mixing can also be accomplished by batch mixing or partial batch mixing.

As is also well understood, when the fracturing fluid is broken and the hardenable resin composition coated proppant particles are deposited in the fractures formed, the fractures close on the proppant particles. The partially closed fractures apply pressure on the hardenable resin composition coated proppant whereby the proppant particles are forced into contact with each other while the resin composition hardens. The hardening of the resin composition under pressure helps bring about the consolidation of the resin coated particles into a hard permeable pack having sufficient compressive strength to prevent unconsolidated proppant and formation sand from flowing out of the fractures with produced fluids. In fracture treatments carried out in unconsolidated formations, good consolidation of proppant is required in the perforations which extend from the inside of the well bore through casing and cement into the unconsolidated formation as well as in the fractured portions of the unconsolidated formation surrounding the well bore. The last portion of the proppant which is deposited in the perforations and in the fractures is coated with a hardenable resin composition and is caused to harden. The resulting consolidated proppant in the perforations and fractures contributes to the prevention of proppant flow-back. However, there is often little closure pressure applied to the hardenable resin coated proppant in the fractures close to the well bore and there is no closure pressure applied to the hardenable resin coated proppant particles in the perforations. In addition, the hardenable resin coated proppant particles can be separated from each other by films of the gelled fracturing fluid and because of the presence of the fracturing fluid films, the proppant particles do not sufficiently consolidate. As a result, the consolidated permeable packs formed in the perforations and fractures often have less than sufficient compressive strength to prevent unconsolidated proppant and formation sand from flowing out of the perforations and fractures. These problems are solved by including in the hardenable resin composition one or more hydrolyzable esters which function to break gelled fracturing fluid films on the particles, and a surfactant for facilitating the coating of the resin composition on the proppant particles and for causing the hardenable resin composition to flow to the contact points between adjacent resin coated proppant particles so that the particles are consolidated into a high strength permeable mass.

In accordance with the above described method all of the proppant particles are coated with the liquid hardenable resin composition. In order to conserve the liquid hardening agent component used and to reduce the cost of the fracturing procedure, the volume ratio of the liquid hardening agent component can be varied. That is, in a preferred technique, the volume ratio of the liquid hardening agent component to the liquid hardenable resin component is varied from an initial volume ratio which produces a high strength permeable pack to a lower volume ratio which produces a lower strength resilient permeable pack and then back to the initial volume ratio which produces a high strength permeable pack adjacent to the well bore. As mentioned, because all of the proppant particles are coated with the liquid hardenable resin, there are no unconsolidated proppant particles in the bottoms of the fractures and consequently, the consolidated permeable pack does not allow flow-back to occur. The initial volume ratio of the liquid hardening agent component to the liquid hardenable resin component is generally in the range of from about 1:10 to about 1:1 and the lower volume ratio is in the range of from about 1:20 to about 1:5. Preferably, the initial volume ratio of the liquid hardening agent component to the liquid hardenable resin component is about 1:1.5 and the lower volume ratio is about 1:5.

Thus, another method of the present invention includes the following steps. A liquid hardenable resin component is provided comprised of a hardenable resin and optionally, a solvent for the resin having a high flash point. A liquid hardening agent component is provided comprised of a hardening agent, a silane coupling agent, a hydrolyzable ester for breaking gelled fracturing fluid films on the proppant particles, a surfactant for facilitating the coating of the resin on the proppant particles and for causing the hardenable resin to flow to the contact points between adjacent resin coated proppant particles, a liquid carrier fluid having a high flash point and optionally, a viscosifying agent for viscosifying the carrier fluid and dispersing the hardening agent when the hardening agent is a particulate solid. In addition, a source of dry proppant particles and a gelled liquid fracturing fluid are provided. The gelled liquid fracturing fluid is pumped into the subterranean zone to form one or more fractures therein and to place the resin composition coated proppant particles in the fractures. As the fractures are formed, the liquid hardenable resin component is mixed with the liquid hardening agent component, preferably on-the-fly, to form the resin composition. The volume ratio of the liquid hardening agent component to the liquid hardenable resin component is varied, and the hardenable resin composition formed is continuously coated onto dry proppant particles conveyed from the source thereof, preferably on-the-fly, to form hardenable resin composition coated proppant particles. The hardenable resin composition coated proppant particles are continuously mixed with the fracturing fluid being pumped, preferably on-the-fly, whereby the hardenable resin composition coated proppant particles are suspended therein. After the hardenable resin composition coated proppant particles have been placed in the one or more fractures formed in the subterranean zone, the pumping of the gelled liquid fracturing fluid and other related steps are terminated. Thereafter, the gelled liquid fracturing fluid breaks into a thin fluid, the hardenable resin composition coated proppant particles are deposited in the fractures and the resin composition hardens and consolidates the proppant particles in the one or more fractures into high strength permeable packs which do not allow proppant flow-back.

Yet another method of this invention for coating dry proppant particles with a liquid hardenable resin composition and suspending the coated proppant particles in a fracturing fluid, the resin composition hardening and consolidating the resin coated proppant particles into a high strength permeable mass which prevents proppant flow-back after being placed in one or more fractures formed in a subterranean zone by way of a perforated interval or intervals in a well bore penetrating the subterranean zone is comprised of the following steps. A liquid hardenable resin component is provided comprised of a hardenable resin and optionally, a solvent for the resin having a high flash point. A liquid hardening agent component is provided comprised of a hardening agent, a silane coupling agent, a hydrolyzable ester for breaking gelled fracturing fluid films on the proppant particles, a surfactant for facilitating the coating of the resin on the proppant particles and for causing the hardenable resin to flow to the contact points between adjacent resin coated proppant particles, a liquid carrier fluid having a high flash point and optionally, a viscosifying agent for viscosifying the carrier fluid and dispersing the hardening agent when the hardening agent is a particulate solid. In addition, a source of dry proppant particles and a gelled liquid fracturing fluid are provided. The gelled liquid fracturing fluid is pumped into the subterranean zone to form one or more fractures therein and to place the proppant particles in the fractures. As the fractures are formed, the liquid hardenable resin component is mixed with the liquid hardening agent component, preferably on-the-fly, to form the hardenable resin composition. The hardenable resin composition formed is intermittently coated onto dry proppant particles conveyed from the source thereof, preferably on-the-fly, to form hardenable resin composition coated proppant particles and uncoated proppant particles. The hardenable resin composition coated proppant particles and uncoated proppant particles are continuously mixed with the fracturing fluid being pumped, preferably on-the-fly, whereby the hardenable resin composition coated proppant particles and uncoated proppant particles are suspended therein. After the hardenable resin composition coated proppant particles and uncoated proppant particles have been placed in the one or more fractures formed in the subterranean zone, the pumping of the gelled liquid fracturing fluid and other related steps are terminated. Thereafter, the gelled liquid fracturing fluid breaks into a thin fluid, the hardenable resin composition coated proppant particles and the uncoated particles are deposited in the fractures and the resin composition hardens and consolidates the proppant particles in the one or more fractures into high strength permeable packs which do not allow proppant flow-back.

In a preferred technique, when the well bore includes a single perforated interval having a length of less than about 50 feet or several perforated intervals having a combined length of less than about 50 feet, hardenable resin composition coated proppant particles are suspended in the fracturing fluid during the initial time period of pumping the fracturing fluid, uncoated proppant particles are suspended in the fracturing fluid during the middle time period of pumping the fracturing fluid and hardenable resin composition coated proppant particles are suspended in the fracturing fluid during the last time period of pumping the fracturing fluid. This technique results in hardenable resin composition coated proppant particles entering the fractures first and depositing hardenable resin composition coated proppant in the bottom of the fractures and additional hardenable resin composition coated particles entering the fractures last which moves uncoated proppant particles to the middle of the fractures and prevents uncoated proppant particles from flowing back with produced fluids.

Most preferably, the resin composition coated proppant particles suspended in the fracturing fluid pumped during the initial time period constitute about 15% of the total proppant particles pumped, the uncoated proppant particles suspended in the fracturing fluid pumped during the middle time period constitute about 60% of the total proppant particles pumped and the resin composition coated proppant particles suspended in the fracturing fluid pumped during the last time period constitute about 25% of the total proppant particles pumped.

When the well bore includes multiple perforated intervals having a length greater than about 50 feet, hardenable resin composition coated proppant particles are suspended in the fracturing fluid during the initial time period of pumping the fracturing fluid, a mixture of resin composition coated proppant particles and uncoated proppant particles are suspended in the fracturing fluid during the middle time period of pumping the fracturing fluid and hardenable resin coated proppant particles are suspended in the fracturing fluid during the last time period of pumping the fracturing fluid.

Most preferably, the resin composition coated proppant particles are suspended in the fracturing fluid pumped during the initial time period constitute about 15% of the total proppant particles pumped, the mixture of the resin composition coated proppant particles and the uncoated proppant particles pumped during the middle time period constitute about 60% of the total proppant particles and the resin composition coated proppant particles suspended in the fracturing fluid pumped during the last time period constitute about 25% of the total proppant particles pumped.

Examples of hardenable resins which can be utilized in the liquid hardenable resin component include, but are not limited to, organic resins such as bisphenol A-epichlorohydrin resin, polyepoxide resin, novolak resin, polyester resin, phenol-aldehyde resin, urea-aldehyde resin, furan resin, urethane resin, glycidyl ethers and mixtures thereof. Of these, bisphenol A-epichlorohydrin resin is preferred. The organic resin utilized is included in the liquid hardenable resin component in an amount in the range of from about 70% to about 100% by weight of the liquid hardenable resin component, preferably an amount of about 85%.

Examples of solvents having high flash points (above about 125° F.) which can optionally be used for the hardenable resin in the liquid hardenable resin component include, but are not limited to, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, d'limonene and fatty acid methyl esters. Of these, dipropylene glycol methyl ether is preferred. The amount of the solvent utilized in the liquid hardenable resin component is in the range of from about 0% to about 30% by weight of the liquid hardenable resin component, preferably in an amount of about 15%.

Examples of the hardening agents which can be used in the liquid hardening agent component include, but are not limited to, amines, aromatic amines, polyamines, aliphatic amines, cyclo-aliphatic amines, amides, polyamides, 4,4'-diaminodiphenyl sulfone, 2-ethyl-4-methyl imidazole and 1,1,3-trichlorotrifluoroacetone. Of these, 4,4'-diaminodiphenyl sulfone is preferred. The hardening agent is included in the liquid hardening agent component in an amount in the range of from about 40% to about 60% by weight of the liquid hardening agent component preferably in an amount of about 50%.

Examples of silane coupling agents which can be used in the liquid hardening agent component include, but are not limited to, N-2-(aminoethyl)-3-aminopropyltrimethoxysilane, 3-glycidoxypropyltrimethoxysilane and n-beta-(aminoethyl)-gamma-aminopropyl trimethoxysilane. Of these, n-beta-(aminoethyl)-gamma-aminopropyl trimethoxysilane is preferred. The silane coupling agent is included in the liquid hardening agent component in an amount in the range of from about 0.1% to about 3% by weight of the liquid hardening agent component.

Examples of hydrolyzable esters which can be utilized in the liquid hardening agent component for facilitating the coating of the resin composition on the proppant particles and for breaking gelled fracturing fluid films thereon include, but are not limited to, a mixture of dimethylglutarate, dimethyladipate and dimethylsuccinate, sorbitol, catechol, dimethylthiolate, methyl salicylate, dimethyl salicylate, dimethylsuccinate and ter-butylhydroperoxide. Of these, a mixture of dimethylglutarate, dimethyladipate and dimethylsuccinate is preferred. The ester or esters are present in the liquid hardening agent component in an amount in the range of from about 0.1% to about 3% by weight of the liquid hardening agent component, preferably in an amount of about 2%.

The surfactants which can be utilized in the liquid hardening agent component for facilitating the coating of the resin on the proppant particles and for causing the hardenable resin to flow to the contact points between adjacent resin coated proppant particles include, but are not limited to, an ethoxylated nonyl phenol phosphate ester, mixtures of one or more cationic surfactants and one or more non-ionic surfactants and an alkyl phosphonate surfactant. The mixtures of one or more cationic and nonionic surfactants are described in U.S. Pat. No. 6,311,733 issued to Todd et al. on Nov. 6, 2001 which is incorporated herein by reference. Of the surfactants that can be used, a $C_{12}$–$C_{22}$ alkyl phosphonate surfactant is preferred. The surfactant or surfactants utilized are included in the liquid hardening agent component in an amount in the range of from about 2% to about 15% by weight of the liquid hardening agent component, preferably in an amount of about 12%.

The liquid carrier fluid having a high flash point (above about 125° F.) in the liquid hardening agent component is selected from the group consisting of dipropylene glycol methyl ether, dipropylene glycol dimethyl ether, dimethyl formamide, diethyleneglycol methyl ether, ethyleneglycol butyl ether, diethyleneglycol butyl ether, propylene carbonate, d'limonene and fatty acid methyl esters. Of these, dipropylene glycol methyl ether is preferred. The liquid carrier fluid is present in the liquid hardening agent component in an amount in the range of from about 20% to about 40% by weight of the liquid hardening agent component, preferably in an amount of about 30%.

Examples of viscosifying agents that can optionally be utilized in the liquid hardening agent component, include, but are not limited to hydroxypropyl cellulose and organophilic clays. Of these, organophilic clay is preferred. Organophilic clays are the reaction product of purified smectite clay (either hectorite or bentonite) and a quaternary ammonium salt. The viscosifying agent is present in the liquid hardening agent component in an amount in the range of from about 0% to about 3% by weight of the liquid hardening agent component, preferably in an amount of about 1%.

As mentioned above, during the time that the liquid hardenable resin component and the liquid hardening agent component are continuously mixed and coated on the dry proppant particles, the rate of the liquid hardening agent component can be varied while the rate of the liquid hardenable resin component is held constant. Stated another way, the volume ratio of the liquid hardening agent component to the liquid hardenable resin component is varied. Preferably, the volume ratio of the liquid hardening agent component to the liquid hardenable resin component is varied from an initial volume ratio to a lower volume ratio and then back to the initial volume ratio. This procedure causes all of the proppant particles to be consolidated with the proppant particles adjacent to the well bore and the proppant particles at the front of the fracture being strongly consolidated and the proppant particles in between being moderately consolidated. This arrangement effectively prevents proppant flowback. The procedure is based on the discovery that reductions in the amount of the liquid hardening agent component from the amount that produces a very hard and strong cured resin causes the resin to become more rubbery or flexible, but it still functions to consolidate the proppant particles. Thus, the middle portion of a consolidated proppant particle pack in a fracture can be resilient and have less compressive strength so long as the end portions of the pack are consolidated with high strength rigid resin.

A variety of fracturing fluids can be utilized in accordance with the present invention including aqueous gels, emulsions and other fluids utilized for forming fractures in subterranean zones and carrying resin composition coated proppant particles into the fractures. The aqueous gels are generally comprised of water and one or more gelling agents. The emulsions can be comprised of two immiscible liquids such as an aqueous gelled liquid and a liquefied, normally gaseous fluid, such as nitrogen.

The preferred fracturing fluids for use in accordance with this invention are aqueous gels comprised of water, a gelling agent for gelling the water and increasing its viscosity, and optionally, a cross-linking agent for cross-linking the gel and further increasing the viscosity of the fluid. The increased viscosity of the gelled or gelled and cross-linked fracturing fluid reduces fluid loss and allows the fracturing fluid to transport significant quantities of suspended proppant particles. The water utilized to form the fracturing fluid can be fresh water, salt water, brine or any other aqueous liquid which does not adversely react with the other components utilized in accordance with this invention.

A variety of gelling agents can be utilized including hydratable polymers which contain one or more functional groups such as hydroxyl, cis-hydroxyl, carboxyl, sulfate, sulfonate, amino or amide. Particularly useful such polymers are polysaccharides and derivatives thereof which contain one or more of the monosaccharide units galactose, mannose, glucoside, glucose, xylose, arabinose, fructose, glucuronic acid or pyranosyl sulfate. Examples of natural hydratable polymers containing the foregoing functional groups and units which are particularly useful in accordance with the present invention include guar gum and derivatives thereof such as hydroxypropyl guar and cellulose derivatives such as hydroxyethyl cellulose. Hydratable synthetic polymers and copolymers which contain the above mentioned functional groups can also be utilized. Examples of such synthetic polymers include, but are not limited to, polyacrylate, polymethacrylate, polyacrylamide, polyvinyl alcohol and polyvinylpyrrolidone. The gelling agent used is generally combined with the water in the fracturing fluid in an amount in the range of from about 0.1% to about 1% by weight of the water.

Examples of cross-linking agents which can be utilized to further increase the viscosity of a gelled fracturing fluid are alkali metal borates, borax, boric acid and compounds which are capable of releasing multivalent metal ions in aqueous solutions. Examples of the multivalent metal ions are chromium, zirconium, antimony, titanium, iron, zinc or aluminum. When used, the cross-linking agent is generally added to the gelled water in an amount in the range of from about 0.01% to about 1% by weight of the water.

The above described gelled or gelled and cross-linked fracturing fluids typically also include internal delayed gel breakers such as those of the enzyme type, the oxidizing type, the acid buffer type and the temperature activated type, all of which are well known to those skilled in the art. The gel breakers cause the viscous carrier fluids to revert to thin fluids that can be produced back to the surface after they have been used to place proppant particles in subterranean fractures. The gel breaker used is generally present in the fracturing fluid in an amount in the range of from about 1% to about 5% by weight of the gelling agent therein. The fracturing fluids can also include one or more of a variety of well known additives such as gel stabilizers, fluid loss control additives, clay stabilizers, bacteriacides and the like.

The proppant particles utilized in accordance with the present invention are generally of a size such that formation particulate solids which migrate with produced fluids are prevented from being produced from the subterranean zone.

Various kinds of proppant can be utilized including graded sand, bauxite, ceramic materials, glass materials, walnut hulls, polymer beads and the like. Generally, the proppant particles have a size in the range of from about 2 to about 400 mesh, U.S. Sieve Series. The preferred proppant is graded sand having a particle size in the range of from about 10 to about 70 mesh, U.S. Sieve Series. Preferred sand particle size distribution ranges are one or more of 10–20 mesh, 20–40 mesh, 40–60 mesh or 50–70 mesh, depending on the particular size and distribution of formation solids to be screened out by the consolidated proppant particles.

The liquid hardenable resin compositions of this invention for coating proppant particles are basically comprised of a hardenable resin, a hardening agent for causing the hardenable resin to harden, a silane coupling agent, a hydrolyzable ester for breaking gelled fracturing fluid films on the proppant particles, a surfactant for facilitating the coating of the hardenable resin composition on the proppant particles and for causing the hardenable resin composition to flow to the contact points between adjacent resin coated proppant particles and a liquid carrier fluid having a flash point above about 125° F.

Examples of the hardenable resins which can be utilized in the hardenable resin compositions of this invention include, but are not limited to, bisphenol A-epichlorohydrin resin, polyepoxide resin, novolac resin, polyester resin, phenol-aldehyde resin, urea-aldehyde resin, furan resin, urethane resin, glycidyl ether and mixtures thereof. Of these, bisphenol A-epichlorohydrin resin is preferred. The hardenable resin is included in the liquid hardenable resin composition in an amount in the range of from about 70% to about 100% by weight of the composition, more preferably in an amount of about 85%.

Examples of hardening agents which can be utilized include, but are not limited to, amines, aromatic amines, polyamines, aliphatic amines, cyclo-aliphatic amines, amides, polyamides, 4,4'-diaminodiphenyl sulfone, 2-ethyl-4-methyl imidazole and 1,1,3-trichlorotrifluoroacetone. Of these, 4,4'-diaminodiphenyl sulfone is preferred. The hardening agent is included in the liquid hardenable resin composition in an amount in the range of from about 40% to about 60% by weight of the composition, more preferably in an amount of about 50%.

Examples of silane coupling agents which can be utilized include, but are not limited to, N-2-(aminoethyl)-3-aminopropyltrimethoxysilane, 3-glycidoxypropyltrimethoxysilane and n-beta-(aminoethyl)-gamma-aminopropyl trimethoxysilane. Of these, n-beta-(aminoethyl)-gamma-aminopropyl trimethoxysilane is preferred. The silane coupling agent is included in the liquid hardenable resin composition in an amount in the range of from about 0.1% to about 3% by weight of the composition, more preferably in an amount of about 1.5%.

Examples of hydrolyzable esters which can be used include, but are not limited to, a mixture of dimethylglutarate, dimethyladipate and dimethylsuccinate, sorbitol, catechol, dimethylthiolate, methyl salicylate, dimethyl salicylate, dimethylsuccinate and terbutylhydroperoxide. Of these, a mixture of dimethylglutarate, dimethyladipate and dimethylsuccinate are preferred. The hydrolyzable ester is included in the liquid hardenable resin composition in an amount in the range of from about 0.1% to about 3% by weight of the composition, more preferably in an amount of about 2%.

Examples of surfactants which can be utilized include, but are not limited to, ethoxylated nonyl phenol phosphate ester, mixtures of one or more cationic surfactants and one or more non-ionic surfactants and a $C_{12}$–$C_{22}$ alkyl phosphonate surfactant. Of these, a $C_{12}$–$C_{22}$ alkyl phosphonate surfactant is preferred. The surfactant is included in the liquid hardenable resin composition in an amount in the range of from about 2% to about 15% by weight of the composition, more preferably in an amount of about 12%.

Finally, examples of the liquid carrier fluid that can be utilized include, but are not limited to, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, d'limonene and fatty acid methyl esters. Of these, dipropylene glycol methyl ether is preferred. The liquid carrier fluid is included in the liquid hardenable resin composition in an amount in the range of from about 20% to about 40% by weight of the composition, more preferably in an amount of about 30%.

A preferred improved method of this invention for coating dry proppant particles with a hardenable resin composition and suspending the coated proppant particles in a fracturing fluid, the resin composition hardening and consolidating the resin coated proppant particles into a high strength permeable mass which prevents proppant flow-back after being placed in one or more fractures in a subterranean zone comprises the steps of: (a) providing a liquid hardenable resin component comprised of a hardenable resin and optionally, a solvent for the resin; (b) providing a liquid hardening agent component comprised of a particulate solid hardening agent, a silane coupling agent, a hydrolyzable ester for breaking gelled fracturing fluid films on the proppant particles, a surfactant for facilitating the coating of the resin on the proppant particles and for causing the hardenable resin to flow to the contact points between adjacent resin coated proppant particles, a liquid carrier fluid and optionally, a viscosifying agent for viscosifying the carrier fluid and dispersing the hardening agent when the hardening agent is a particulate solid; (c) providing a source of dry proppant particles (d) providing a gelled liquid fracturing fluid; (e) pumping the gelled liquid fracturing fluid into the subterranean zone to form the one or more fractures therein and to place the hardenable resin composition coated proppant particles in the fractures; (f) as the fractures are formed in step (e), mixing the liquid hardenable resin component with the liquid hardening agent component to form the hardenable resin composition; (g) coating the hardenable resin composition produced in step (f) onto dry proppant particles conveyed from the source thereof to form resin composition coated proppant particles; (h) mixing the resin composition coated proppant particles produced in step (g) with the fracturing fluid pumped in accordance with step (e) whereby the resin composition coated proppant particles are suspended therein; (i) terminating steps (e), (f), (g) and (h) when the resin composition coated proppant particles have been placed in the one or more fractures; and (j) allowing the hardenable resin composition on the resin composition coated proppant particles to harden and consolidate the proppant particles into one or more high strength permeable packs which prevent proppant flow-back.

Another preferred improved method of coating dry proppant particles with a hardenable resin composition and suspending the coated proppant particles in a fracturing fluid, the resin composition hardening and consolidating the resin coated proppant particles into a high strength permeable mass which prevents proppant flow-back after being placed in one or more fractures formed in a subterranean zone comprises the steps of: (a) providing a liquid hardenable resin component comprised of a hardenable resin and optionally, a solvent for the resin; (b) providing a liquid hardening agent component comprised of a particulate solid hardening agent, a silane coupling agent, a hydrolyzable ester for breaking gelled fracturing fluid films on the proppant particles, a surfactant for facilitating the coating of the resin on the proppant particles and for causing the hardenable resin to flow to the contact points between adjacent resin coated proppant particles, a liquid carrier and optionally, a viscosifying agent for viscosifying the carrier fluid and dispersing the hardening agent when the hardening agent is a particulate solid; (c) providing a source of dry proppant particles; (d) providing a gelled liquid fracturing fluid; (e) pumping the gelled liquid fracturing fluid into the subterranean zone to form the one or more fractures therein and to place the resin composition coated proppant particles in the fractures; (f) as the fractures are formed in step (e), mixing the liquid hardenable resin component with the liquid hardening agent component to form the hardenable resin composition; (g) varying the volume ratio of the liquid hardening agent component to the liquid hardenable resin component during step (f); (h) coating the hardenable resin composition produced in steps (f) and (g) onto dry proppant particles conveyed from the source thereof to form resin composition coated proppant particles; (i) mixing the resin composition coated proppant particles produced in step (h) with the fracturing fluid pumped in accordance with step (e) whereby the resin composition coated proppant particles are suspended therein; (j) terminating steps (e), (f), (g), (h) and (i) when the resin composition coated proppant particles have been placed in the one or more fractures; and (k) allowing the hardenable resin composition on the resin composition coated proppant particles to harden and consolidate the proppant particles into one or more high strength permeable packs which prevent proppant flow-back.

Yet another preferred method of coating dry proppant particles with a liquid hardenable resin composition and suspending the coated proppant particles in a fracturing fluid, the resin composition hardening and consolidating the resin coated proppant particles into a high strength permeable mass which prevents proppant flow-back after being placed in one or more fractures formed in a subterranean zone by way of a perforated interval or intervals in a well bore penetrating the subterranean zone comprises the steps of: (a) providing a liquid hardenable resin component comprised of a hardenable resin and optionally, a solvent for the resin; (b) providing a liquid hardening agent component comprised of a particulate solid hardening agent, a silane coupling agent, a hydrolyzable ester for breaking fracturing fluid films on the proppant particles, a surfactant for facilitating the coating of the resin on the proppant particles and for causing the hardenable resin to flow to the contact points between adjacent resin coated proppant particles, a liquid carrier fluid and optionally, a viscosifying agent for viscosifying the carrier fluid and dispersing the hardening agent when the hardening agent is a particulate solid; (c) providing a source of dry proppant particles; (d) providing a gelled liquid fracturing fluid; (e) pumping the gelled liquid fracturing fluid into the subterranean zone to form the one or more fractures therein and to place the proppant particles in the fractures; (f) as the fractures are formed in step (e), mixing the liquid hardenable resin component with the liquid hardening agent component to form the liquid hardenable resin composition; (g) intermittently coating the hardenable resin composition produced in step (f) onto dry proppant particles continuously conveyed from the source thereof to form resin composition coated proppant particles and uncoated proppant particles; (h) mixing the resin composition coated proppant particles and uncoated proppant particles from step (g) with the fracturing fluid pumped in accordance with step (e) whereby the resin composition coated proppant particles and uncoated proppant particles are suspended therein; (i) terminating steps (e), (f), (g) and (h) when the resin composition coated proppant particles and uncoated proppant particles have been placed in the one or more fractures; and (j) allowing the hardenable resin composition on the resin composition coated particles to harden and consolidate the proppant particles into one or more high strength permeable packs which prevent proppant flow-back.

A preferred liquid hardenable resin composition for coating proppant particles comprises a hardenable resin; a hardening agent for causing the hardenable resin to harden; a silane coupling agent; a hydrolyzable ester for breaking gelled fracturing fluid films on the proppant particles; a surfactant for facilitating the coating of the hardenable resin composition on the proppant particles and for causing the hardenable resin composition to flow to the contact points between adjacent resin coated proppant particles; and a liquid carrier fluid having a flash point above about 125° F.

In order to further illustrate the methods of the present invention, the following examples are given.

EXAMPLE 1

A liquid hardenable resin component of this invention was prepared by mixing a bisphenol A-epichlorohydrin resin with a dipropylene glycol methyl ether solvent. The bisphenol A-epichlorohydrin resin was present in the resulting liquid hardenable resin component in an amount of about 85% by weight of the liquid hardenable resin component and the solvent was present in the liquid hardenable resin component in an amount of about 15% by weight of the liquid hardenable resin component.

Liquid hardening agent components were prepared by combining the following chemicals: a particulate solid 4,4'-diaminodiphenyl sulfone hardening agent in an amount of about 50% by weight of the liquid hardening agent component; a n-beta-(aminoethyl)-gamma-aminopropyl trimethoxysilane coupling agent in an amount of about 2% by weight of the liquid hardening agent component; a mixture of dimethylglutarate, dimethyladipate and dimethylsuccinate hydrolyzable esters in an amount of about 2% by weight of the liquid hardening agent component; a $C_{12}$–$C_{22}$ alkyl phosphonate surfactant in an amount of about 12% by weight of the liquid hardening agent component; a dipropylene glycol methyl ether or dipropylene glycol dimethyl ether liquid carrier fluid in an amount of about 30% by weight of the liquid hardening agent component; and an organophilic clay viscosifying agent in an amount of about 1% by weight of the liquid hardening agent component.

Fluid Compatibility

Portions of the liquid hardenable resin component were mixed with the liquid hardening agent components in a weight ratio of 1.5:1. The resulting hardenable resin compositions were coated on dry 20/40 mesh bauxite proppant particles in the amount of 3% by weight of the proppant particles. The hardenable resin composition coated proppant particles were then mixed with fluids comprised of water gelled with carboxymethylhydroxypropyl guar. After the addition of the proppant particles, a zirconium cross-linker was added to the mixtures and the mixtures were heated to a temperature of 325° F. in a Model-50 viscometer. The times that the viscosities of the cross-linked gels remained above 500 centipoises at temperatures of 325° F. were determined. Typically, the desirable time for the mixture to remain at or above a viscosity of 500 centipoises is about 90 minutes. The results of these tests are set forth in Table 1 below.

TABLE 1

| Gel Sample | Gel Time @ 500 cp |
| --- | --- |
| Control | >130 min |
| Mixed resin using dipropylene glycol methyl ether as solvent | 83 min |
| Mixed resin using dipropylene glycol dimethyl ether as solvent | >130 min |

From Table 1, it can be seen that the fracturing fluid containing hardenable resin composition coated proppant particles had a very good gel time when the solvent in the liquid hardenable resin component and the carrier fluid in the liquid hardening agent component were both dipropylene glycol methyl ether. When the experiment was repeated using dipropylene glycol dimethyl ether as the solvent and carrier fluid, a good gel time was also obtained.

EXAMPLE 2

Hardenable resin compositions were prepared and coated on dry 20/40 mesh bauxite proppant particles as described in Example 1 above. The hardenable resin composition coated proppant particles were mixed with water gelled with carboxymethylhydroxypropyl guar and cross-linked with a zirconium cross-linker. The resulting viscous fluids containing the resin coated proppant particles were stirred in a consistometer to simulate pumping for 1 hour at 175° F. The fluids were then transferred and packed in brass flow cells without closure stress. The resulting proppant packs were cured in an oven at 325° F. for 3 hours. Flow-back tests were conducted with tap water on the flow cells to determine if the cured proppant was capable of withstanding high flow rates. After the flow-back testing which showed that proppant flow-back did not occur, cores were obtained from the proppant packs to determine the unconfined compressive strength as a means of consolidation strength measurement. The results of these tests over time are set forth in Table 2 for hardenable resin compositions including dipropylene glycol methyl ether and dipropylene glycol dimethyl ether solvents and carrier fluids. The results of these tests are given in Table 2 below.

TABLE 2

| | Consolidation Strength (psi) | |
| --- | --- | --- |
| Day | Mixed resin using dipropylene glycol methyl ether as solvent | Mixed resin using dipropylene glycol dimethyl ether as solvent |
| 1 | 1020 | 1120 |
| 2 | 985 | 1210 |
| 3 | 1080 | 1325 |
| 4 | 1140 | 1460 |
| 5 | 1230 | 1610 |
| 8 | 1225 | 1580 |

From Table 2 it can be seen that the consolidated packs of hardenable resin composition coated bauxite proppant particles had excellent compressive strengths.

Thus, the present invention is well adapted to attain the objects and advantages mentioned as well as those which are inherent therein. While numerous changes may be made by those skilled in the art, such changes are encompassed within the spirit of this invention as defined by the appended claims.

What is claimed is:

1. A method of coating dry proppant particles with a liquid hardenable resin composition and suspending the coated proppant particles in a fracturing fluid, the resin composition hardening and consolidating the resin coated proppant particles into a high strength permeable mass which prevents proppant flow-back after being placed in one or more fractures formed in a subterranean zone comprising the steps of:

(a) providing a liquid hardenable resin component comprised of a hardenable resin;

(b) providing a liquid hardening agent component comprised of a hardening agent, a silane coupling agent, a hydrolyzable ester for breaking gelled fracturing fluid films on said proppant particles, a surfactant for facilitating the coating of said resin on said proppant particles and for causing said hardenable resin to flow to the contact points between adjacent resin coated proppant particles, and a liquid carrier fluid;

(c) providing a source of dry proppant particles;

(d) providing a gelled liquid fracturing fluid;

(e) pumping said gelled liquid fracturing fluid into said subterranean zone to form said one or more fractures therein and to place said hardenable resin composition coated proppant particles in said fractures;

(f) as said fractures are formed in step (e), mixing said liquid hardenable resin component with said liquid hardening agent component to form said liquid hardenable resin composition;

(g) coating said liquid hardenable resin composition produced in step (f) onto dry proppant particles conveyed from said source thereof to form hardenable resin composition coated proppant particles;

(h) mixing said hardenable resin composition coated proppant particles produced in step (g) with said fracturing fluid pumped in accordance with step (e) whereby said hardenable resin composition coated proppant particles are suspended therein;

(i) terminating steps (e), (f), (g) and (h) when said resin composition coated proppant particles have been placed in said one or more fractures; and (j) allowing said hardenable resin composition on said resin composition coated proppant particles to harden and consolidate said proppant particles into one or more high strength permeable packs which prevent proppant particle flow-back.

2. The method of claim 1 wherein said hardenable resin in said liquid hardenable resin component is an organic resin comprising at least one member selected from the group consisting of bisphenol A-epichlorohydrin resin, polyepoxide resin, novolak resin, polyester resin, phenol-aldehyde resin, urea-aldehyde resin, furan resin, urethane resin, glycidyl ether and mixtures thereof.

3. The method of claim 1 wherein said hardenable resin in said liquid hardenable resin component is comprised of bisphenol A-epichlorohydrin resin.

4. The method of claim 1 which further comprises a solvent for said resin in said liquid hardenable resin component.

5. The method of claim 4 wherein said solvent for said resin in said liquid hardenable resin component comprises at least one member selected from the group consisting of dipropylene glycol methyl ether, dipropylene glycol dimethyl ether, dimethyl formamide, diethyleneglycol methyl ether, ethyleneglycol butyl ether, diethyleneglycol butyl ether, propylene carbonate, d'limonene and fatty acid methyl esters.

6. The method of claim 4 wherein said solvent for said resin in said liquid hardenable resin component is comprised of dipropylene glycol methyl ether.

7. The method of claim 1 wherein said hardening agent in said liquid hardening agent component comprises at least one member selected from the group consisting of amines, aromatic amines, polyamines, aliphatic amines, cycloaliphatic amines, amides, polyamides, 4,4'-diaminodiphenyl sulfone, 2-ethyl-4-methyl imidazole and 1,1,3-trichlorotrifluoroacetone.

8. The method of claim 1 wherein said hardening agent in said liquid hardening agent component is comprised of 4,4'-diaminodiphenyl sulfone.

9. The method of claim 1 wherein said silane coupling agent in said liquid hardening agent component comprises at least one member selected from the group consisting of N-2-(aminoethyl)-3-aminopropyltrimethoxysilane, 3-glycidoxypropyltrimethoxysilane and n-beta-(aminoethyl)-gamma-aminopropyl trimethoxysilane.

10. The method of claim 1 wherein said silane coupling agent in said liquid hardening agent component is comprised of n-beta-(aminoethyl)-gamma-aminopropyl trimethoxysilane.

11. The method of claim 1 wherein said hydrolyzable ester for breaking gelled fracturing fluid films on said proppant particles in said liquid hardening agent component comprises at least one member selected from the group consisting of a mixture of dimethylglutarate, dimethyladipate and dimethylsuccinate, sorbitol, catechol, dimethylthiolate, methyl salicylate, dimethyl salicylate, dimethyl succinate and terbutylhydroperoxide.

12. The method of claim 1 wherein said hydrolyzable ester for breaking gelled fracturing fluid films on said proppant particles in said liquid hardening agent component is comprised of a mixture of dimethylglutarate, dimethyladipate and dimethylsuccinate.

13. The method of claim 1 wherein said surfactant for facilitating the coating of said resin on said proppant particles and for causing said hardenable resin to flow to the contact points between adjacent resin coated proppant particles in said liquid hardening agent component comprises at least one member selected from the group consisting of an ethoxylated nonyl phenol phosphate ester, mixtures of one or more cationic surfactants and one or more non-ionic surfactants and a $C_{12}$–$C_{22}$ alkyl phosphonate surfactant.

14. The method of claim 1 wherein said surfactant for facilitating the coating of said resin on said proppant particles and for causing said hardenable resin to flow to the contact points between adjacent resin coated proppant particles in said liquid hardening agent component is comprised of a $C_{12}$–$C_{22}$ alkyl phosphonate surfactant.

15. The method of claim 1 wherein said liquid carrier fluid in said liquid hardening agent component comprises at least one member selected from the group consisting of dipropylene glycol methyl ether, dipropylene glycol dimethyl ether, dimethyl formamide, diethyleneglycol methyl ether, ethyleneglycol butyl ether, diethyleneglycol butyl ether, propylene carbonate, d'limonene and fatty acid methyl esters.

16. The method of claim 1 wherein said liquid carrier fluid in said liquid hardening agent component is comprised of dipropylene glycol methyl ether.

17. The method of claim 1 which further comprises a viscosifying agent for viscosifying said carrier fluid and dispersing said hardening agent when said hardening agent is particulate solid.

18. The method of claim 17 wherein said viscosifying agent in said liquid hardening agent component is comprised of an organophilic clay.

19. The method of claim 1 which further comprises the step of varying the volume ratio of said liquid hardening agent component to said liquid hardenable resin component during step (f).

20. The method of claim 19 wherein the volume ratio of said liquid hardening agent component to said liquid hardenable resin component is varied from an initial volume ratio to a lower volume ratio and then back to said initial volume ratio.

21. The method of claim 19 wherein said initial volume ratio of said liquid hardening agent component to said liquid hardenable resin component is in the range of from about 1:10 to about 1:1 and said lower volume ratio is in the range of from about 1:20 to about 1:5.

22. The method of claim 19 wherein said initial volume ratio of said liquid hardening agent component to said liquid hardenable resin component is about 1:1.5 and said lower volume ratio is about 1:5.

23. A method of coating dry proppant particles with a liquid hardenable resin composition and suspending the coated proppant particles in a fracturing fluid, the resin composition hardening and consolidating the resin coated proppant particles into a high strength permeable mass which prevents proppant flow-back after being placed in one or more fractures formed in a subterranean zone comprising the steps of:

(a) providing a liquid hardenable resin component comprised of a hardenable resin;

(b) providing a liquid hardening agent component comprised of a hardening agent, a silane coupling agent, a hydrolyzable ester for breaking fracturing fluid films on said proppant particles, a surfactant for facilitating the coating of said resin on said proppant particles and for causing said hardenable resin to flow to the contact points between adjacent resin coated proppant particles and a liquid carrier fluid; and (c) providing a source of dry proppant particles;

(d) providing a gelled liquid fracturing fluid;

(e) pumping said gelled liquid fracturing fluid into said subterranean zone to form said one or more fractures therein and to place said resin composition coated proppant particles in said fractures;

(f) as said fractures are formed in step (e), mixing said liquid hardenable resin component with said liquid hardening agent component to form said liquid hardenable resin composition;

(g) varying the volume ratio of said liquid hardening agent component to said liquid hardenable resin component during step (f);

(h) coating said hardenable resin composition produced in steps (f) and (g) onto dry proppant particles conveyed from said source thereof to form resin composition coated proppant particles;

(i) mixing said resin composition coated proppant particles produced in step (h) with said fracturing fluid pumped in accordance with step (e) whereby said resin composition coated proppant particles are suspended therein;

(j) terminating steps (e), (f), (g), (h) and (i) when said resin composition coated proppant particles have been placed in said one or more fractures; and (k) allowing said hardenable resin composition on said resin composition coated proppant particles to harden and consolidate said proppant particles into one or more high strength permeable packs which prevent proppant flow-back.

24. The method of claim 23 wherein said hardenable resin in said liquid hardenable resin component is an organic resin comprising at least one member selected from the group consisting of bisphenol A-epichlorohydrin resin, polyepoxide resin, novolak resin, polyester resin, phenol-aldehyde resin, urea-aldehyde resin, furan resin, urethane resin, glycidyl ether and mixtures thereof.

25. The method of claim 23 wherein said hardenable resin in said liquid hardenable resin component is comprised of a bisphenol A-epichlorohydrin resin.

26. The method of claim 23 which further comprises a solvent for said resin in said liquid hardenable resin component.

27. The method of claim 26 wherein said solvent for said resin in said liquid hardenable resin component comprises at least one member selected from the group consisting of dipropylene glycol methyl ether, dipropyl glycol methyl ether, dimethyl formamide, diethyleneglycol methyl ether, ethyleneglycol butyl ether, diethyleneglycol butyl ether, propylene carbonate, d'limonene and fatty acid methyl esters.

28. The method of claim 26 wherein said solvent for said resin in said liquid hardenable resin component is comprised of dipropylene glycol methyl ether.

29. The method of claim 23 wherein said hardening agent in said liquid hardening agent component comprises at least one member selected from the group consisting of amines, aromatic amines, polyamines, aliphatic amines, cycloaliphatic amines, amides, polyamides, 4,4'-diaminodiphenyl sulfone, 2-ethyl-4-methyl imidazole and 1,1,3-trichlorotrifluoroacetone.

30. The method of claim 23 wherein said hardening agent in said liquid hardening agent component is comprised of 4,4'-di aminodiphenyl sulfone.

31. The method of claim 23 wherein said silane coupling agent in said liquid hardening agent component comprised of at least one member selected from the group consisting of N-2-(aminoethyl)-3-aminopropyltrimethoxysilane, 3-glycidoxypropyltrimethoxysilane and n-beta-(aminoethyl)-gamma-aminopropyl trimethoxysilane.

32. The method of claim 23 wherein said silane coupling agent in said liquid hardening agent component is comprised of n-beta-(aminoethyl)-gamma-aminopropyl trimethoxysilane.

33. The method of claim 23 wherein said hydrolyzable ester for breaking gelled fracturing fluid films on said proppant particles in said liquid hardening agent component comprises at least one member selected from the group consisting of a mixture of dimethylglutarate, dimethyladipate and dimethylsuccinate, sorbitol, catechol, dimethylthiolate, methyl salicylate, dimethyl salicylate, dimethyl succinate and terbutylhydroperoxide.

34. The method of claim 23 wherein said hydrolyzable ester for breaking gelled fracturing fluid films on said proppant particles in said liquid hardening agent component is comprised of a mixture of dimethylglutarate, dimethyladipate and dimethylsuccinate.

35. The method of claim 23 wherein said surfactant for facilitating the coating of said resin on said proppant particles and for causing said hardenable resin to flow to the contact points between adjacent resin coated proppant particles in said liquid hardening agent component comprises at least one member selected from the group consisting of an ethoxylated nonyl phenol phosphate ester, mixtures of one or more cationic surfactants and one or more non-ionic surfactants and a $C_{12}$–$C_{22}$ alkyl phosphonate surfactant.

36. The method of claim 23 wherein said surfactant for facilitating the coating of said resin on said proppant particles and for causing said hardenable resin to flow to the contact points between adjacent resin coated proppant particles in said liquid hardening agent component is comprised of a $C_{12}$–$C_{22}$ alkyl phosphonate surfactant.

37. The method of claim 23 wherein said liquid carrier fluid in said liquid hardening agent component comprises at least one member selected from the group consisting of dipropylene glycol methyl ether, dipropylene glycol dimethyl ether, dimethyl formamide, diethyleneglycol methyl ether, ethylene glycol butyl ether, diethyleneglycol butyl ether, propylene carbonate, d'limonene and fatty acid methyl esters.

38. The method of claim 23 wherein said liquid carrier fluid in said liquid hardening agent component is comprised of dipropylene glycol methyl ether.

39. The method of claim 23 which further comprises a viscosifying agent for viscosifying said carrier fluid and dispersing said hardening agent when said hardening agent is a particulate solid.

40. The method of claim 39 wherein said viscosifying agent in said liquid hardening agent component is comprised of an organophilic clay.

41. The method of claim 23 wherein the volume ratio of said liquid hardening agent component to said liquid hardenable resin component is varied in step (g) from an initial volume ratio to a lower volume ratio and then back to said initial volume ratio.

42. The method of claim 41 wherein said initial volume ratio of said liquid hardening agent component to said liquid hardenable resin component is in the range of from about 1:10 to about 1:1 and said lower volume ratio is in the range of from about 1:20 to about 1:5.

43. The method of claim 41 wherein said initial volume ratio of said liquid hardening agent component to said liquid hardenable resin component is about 1:1.5 and said lower volume ratio is about 1:5.

44. A method of coating dry proppant particles with a liquid hardenable resin composition and suspending the coated proppant particles in a fracturing fluid, the resin composition hardening and consolidating the resin coated proppant particles into a high strength permeable mass which prevents proppant flow-back after being placed in one or more fractures formed in a subterranean zone by way of a perforated interval or intervals in a well bore penetrating the subterranean zone comprising the steps of:

(a) providing a liquid hardenable resin component comprised of a hardenable resin;

(b) providing a liquid hardening agent component comprised of a hardening agent, a silane coupling agent, a hydrolyzable ester for breaking fracturing fluid films on said proppant particles, a surfactant for facilitating the coating of said resin on said proppant particles and for causing said hardenable resin to flow to the contact points between adjacent resin coated proppant particles and a liquid carrier fluid;

(c) providing a source of dry proppant particles;

(d) providing a gelled liquid fracturing fluid;

(e) pumping said gelled liquid fracturing fluid into said subterranean zone to form said one or more fractures therein and to place proppant particles in said fractures;

(f) as said fractures are formed in step (e), mixing said liquid hardenable resin component with said liquid hardening agent component to form said liquid hardenable resin composition;

(g) intermittently coating said hardenable resin composition produced in step (f) onto dry proppant particles conveyed from said source thereof to form hardenable resin composition coated proppant particles and uncoated proppant particles;

(h) mixing said resin composition coated proppant particles and uncoated proppant particles form step (g) with said fracturing fluid pumped in accordance with step (e) whereby said resin composition coated proppant particles and uncoated proppant particles are suspended therein;

(i) terminating steps (e), (f), (g) and (h) when said resin composition coated proppant particles and uncoated proppant particles have been placed in said one or more fractures; and (j) allowing said hardenable resin composition on said resin composition coated proppant particles to harden and consolidate said proppant particles into one or more high strength permeable packs which prevent proppant flow-back.

45. The method of claim 44 wherein said hardenable resin in said liquid hardenable resin component is an organic resin comprising at least one member selected from the group consisting of bisphenol A-epichlorohydrin resin, polyepoxide resin, novolak resin, polyester resin, phenol-aldehyde resin, urea-aldehyde resin, furan resin, urethane resin, glycidyl ether and mixtures thereof.

46. The method of claim 44 wherein said hardenable resin in said liquid hardenable resin component is comprised of bisphenol A-epichlorohydrin resin.

47. The method of claim 44 which further comprises a solvent for said resin in said liquid hardenable resin component.

48. The method of claim 47 wherein said solvent for said resin in said liquid hardening resin component comprises at least one member selected from the group consisting of dipropylene glycol methyl ether, dipropylene glycol dimethyl ether, dimethyl formamide, diethyleneglycol methyl ether, ethylene glycol butyl ether, diethyleneglycol butyl ether, propylene carbonate, d'limonene and fatty acid methyl esters.

49. The method of claim 47 wherein said solvent for said resin in said liquid hardening resin component is comprised of dipropylene glycol methyl ether.

50. The method of claim 44 wherein said hardening agent in said liquid hardening agent component comprises at least one member selected from the group consisting of amines, aromatic amines, polyamines, aliphatic amines, cycloaliphatic amines, amides, polyamides, 4,4'-diaminodiphenyl sulfone, 2-ethyl-4-methyl imidazole and 1,1,3-trichlorotrifluoroacetone.

51. The method of claim 44 wherein said hardening agent in said liquid hardening agent component is comprised of 4,4'-diaminodiphenyl sulfone.

52. The method of claim 44 wherein said silane coupling agent in said liquid hardening agent component comprises at least one member selected from the group consisting of N-2-(aminoethyl)-3-aminopropyltrimethoxysilane, 3-glycidoxypropyltrimethoxysilane and n-beta-(aminoethyl)-gamma-aminopropyl trimethoxysilane.

53. The method of claim 44 wherein said silane coupling agent in said liquid hardening agent component is comprised of n-beta-(aminoethyl)-gamma-aminopropyl trimethoxysilane.

54. The method of claim 44 wherein said hydrolyzable ester for breaking gelled fracturing fluid films on said proppant particles in said liquid hardening agent component comprises at least one member selected from the group consisting of a mixture of dimethylglutarate, dimethyladipate and dimethylsuccinate, sorbitol, catechol, dimethylthiolate, methyl salicylate, dimethyl salicylate, dimethyl succinate and terbutylhydroperoxide.

55. The method of claim 44 wherein said hydrolyzable ester for breaking gelled fracturing fluid films on said proppant particles in said liquid hardening agent component is comprised of a mixture of dimethylglutarate, dimethyladipate and dimethylsuccinate.

56. The method of claim 44 wherein said surfactant for facilitating the coating of said resin on said proppant particles and for causing said hardenable resin to flow to the contact points between adjacent resin coated proppant particles in said liquid hardening agent component comprises at least one member selected from the group consisting of an ethoxylated nonyl phenol phosphate ester, mixtures of one or more cationic surfactants and one or more non-ionic surfactants and a $C_{12}$–$C_{22}$ alkyl phosphonate surfactant.

57. The method of claim 44 wherein said surfactant for facilitating the coating of said resin on said proppant particles and for causing said hardenable resin to flow to the contact points between adjacent resin coated proppant particles in said liquid hardening agent component is comprised of a $C_{12}$–$C_{22}$ alkyl phosphonate surfactant.

58. The method of claim 44 wherein said liquid carrier fluid in said liquid hardening agent component comprises at least one member selected from the group consisting of dipropylene glycol methyl ether, dipropylene glycol dimethyl ether, dimethyl formamide, diethyleneglycol methyl ether, ethylene glycol butyl ether, diethyleneglycol butyl ether, propylene carbonate, d'limonene and fatty acid methyl esters.

59. The method of claim 44 wherein said liquid carrier fluid in said liquid hardening agent component is comprised of dipropylene glycol methyl ether.

60. The method of claim 44 which further comprises a viscosifying agent for viscosifying said carrier fluid and dispersing said hardening agent when said hardening agent is a particulate solid.

61. The method of claim 60 wherein said viscosifying agent in said liquid carrier fluid in said liquid hardening agent component is comprised of an organophilic clay.

62. The method of claim 44 wherein when said well bore includes a single perforated interval having a length of less than about 50 feet or several perforated intervals having a combined length of less than about 50 feet, hardenable resin composition coated proppant particles are suspended in said fracturing fluid during the initial time period of pumping said fracturing fluid, uncoated proppant particles are suspended in said fracturing fluid during the middle time period of pumping said fracturing fluid and hardenable resin composition coated proppant particles are suspended in said fracturing fluid during the last time period of pumping said fracturing fluid.

63. The method of claim 62 wherein said resin composition coated proppant particles suspended in said fracturing fluid pumped during said initial time period constitute about 15% of the total proppant particles pumped, said uncoated proppant particles suspended in said fracturing fluid pumped during said middle time period constitute about 60% of said total proppant particles pumped and said resin composition coated proppant particles suspended in said fracturing fluid pumped during said last time period constitute about 25% of the total proppant particles pumped.

64. The method of claim 44 wherein when said well bore includes multiple perforated intervals having a length greater than about 50 feet, hardenable resin composition coated proppant particles are suspended in said fracturing fluid during the initial time period of pumping said fracturing fluid, a mixture of resin composition coated proppant particles and uncoated proppant particles are suspended in said fracturing fluid during the middle time period of pumping said fracturing fluid and hardenable resin composition coated proppant particles are suspended in said fracturing fluid during the last time period of pumping said fracturing fluid.

65. The method of claim 64 wherein said resin composition coated proppant particles suspended in said fracturing fluid pumped during said initial time period constitute about 15% of the total proppant particles pumped, said mixture of resin composition coated proppant particles and said uncoated proppant particles pumped during said middle time period constitute about 60% of said total proppant particles and said resin composition coated proppant particles suspended in said fracturing fluid pumped during said last time period constitute about 25% of the total proppant particles pumped.

66. A liquid hardenable resin composition for coating proppant particles comprising:

a hardenable resin;

a hardening agent for causing said hardenable resin to harden;

a silane coupling agent;

a hydrolyzable ester for breaking gelled fracturing fluid films on said proppant particles;

a surfactant for facilitating the coating of said hardenable resin composition on said proppant particles and for causing said hardenable resin composition to flow to the contact points between adjacent resin coated proppant particles; and a liquid carrier fluid having a flash point above about 125° F.

67. The composition of claim 66 wherein said hardenable resin is an organic resin comprising at least one member selected from the group consisting of bisphenol A-epichlorohydrin resin polyepoxide resin, novolak resin, polyester resin, phenol-aldehyde resin, urea-aldehyde resin, furan resin, urethane resin, glycidyl ether and mixtures thereof.

68. The composition of claim 66 wherein said hardenable resin is comprised of bisphenol A-epichlorohydrin resin.

69. The composition of claim 66 wherein said hardenable resin is present in an amount in the range of from about 70% to about 100% by weight of said composition.

70. The composition of claim 66 wherein said hardening agent comprises at least one member selected from the group consisting of amines, aromatic amines, polyamines, aliphatic amines, cyclo-aliphatic amines, amides, polyamides, 4,4'-diaminodiphenyl sulfone, 2-ethyl-4-methyl imidazole and 1,1,3-trichlorotrifluoroacetone.

71. The composition of claim 66 wherein said hardening agent is comprised of 4,4-'diaminodiphenyl sulfone.

72. The composition of claim 66 wherein said hardening agent is present in an amount in the range of from about 40% to about 60% by weight of said composition.

73. The composition of claim 66 wherein said silane coupling agent comprises at least one member selected from the group consisting of N-2-(aminoethyl)-3-aminopropyltrimethoxysilane 3-glycidoxypropyltrimethoxysilane and n-beta-(aminoethyl)-gamma-aminopropyl trimethoxysilane.

74. The composition of claim 66 wherein said silane coupling agent is comprised of n-beta-(aminoethyl)-gamma-aminopropyl trimethoxysilane.

75. The composition of claim 66 wherein said silane coupling agent is present in an amount in the range of from about 0.1% to about 3% by weight of said composition.

76. The composition of claim 66 wherein said hydrolyzable ester is comprised of at least one member selected from the group consisting of a mixture of dimethylglutarate, dimethyladipate and dimethylsuccinate, sorbitol, catechol, dimethylthiolate, methyl salicylate, dimethyl salicylate, dimethylsuccinate and terbutylhydroperoxide.

77. The composition of claim 66 wherein said hydrolyzable ester is comprised of a mixture of dimethylglutarate, dimethyladipate and dimethylsuccinate.

78. The composition of claim 66 wherein said hydrolyzable ester is present in an amount in the range of from about 0.1% to about 3% by weight of said composition.

79. The composition of claim 66 wherein said surfactant comprises at least one member selected from the group consisting of an ethoxylated nonyl phenol phosphate ester, mixtures of one or more cationic surfactants and one or more non-ionic surfactants and a an ethoxylated nonyl phenol phosphate ester, mixtures of one or more cationic surfactants and one or more non-ionic surfactants and a $C_{12}$–$C_{22}$ alkyl phosphonate surfactant.

80. The composition of claim 66 wherein said surfactant is comprised of a $C_{12}$–$C_{22}$ alkyl phosphonate surfactant.

81. The composition of claim 66 wherein said surfactant is present in an amount in the range of from about 2% to about 15% by weight of said composition.

82. The composition of claim 66 wherein said liquid carrier fluid having a flash point above about 125° F. comprises at least one member selected from the group consisting of dipropylene glycol methyl ether, dipropylene glycol dimethyl ether, dimethyl formamide, diethyleneglycol methyl ether, ethyleneglycol butyl ether, diethyleneglycol butyl ether, propylene carbonate, d'limonene and fatty acid methyl esters.

83. The composition of claim 66 wherein said liquid carrier fluid is comprised of dipropylene glycol methyl ether.

84. The composition of claim 66 wherein said liquid carrier fluid is present in an amount in the range of from about 20% to about 40% by weight of said composition.

* * * * *